United States Patent
Tsirkin et al.

(10) Patent No.: US 9,201,680 B2
(45) Date of Patent: *Dec. 1, 2015

(54) DISPLAY POWER MANAGEMENT IN DISTRIBUTED VIRTUALIZED SYSTEMS

(75) Inventors: Michael Tsirkin, Yokneam Yillit (IL); Dor Laor, Tel Aviv (IL)

(73) Assignee: Red Hat Israel, Ltd., Raanana (IL)

( * ) Notice: Subject to any disclaimer, the term of this patent is extended or adjusted under 35 U.S.C. 154(b) by 481 days.

This patent is subject to a terminal disclaimer.

(21) Appl. No.: 13/603,215

(22) Filed: Sep. 4, 2012

(65) Prior Publication Data

US 2014/0068604 A1    Mar. 6, 2014

(51) Int. Cl.
| | |
|---|---|
| G06F 9/455 | (2006.01) |
| G06F 3/048 | (2013.01) |
| G06F 1/26 | (2006.01) |
| G06F 9/44 | (2006.01) |

(52) U.S. Cl.
CPC .......... G06F 9/45558 (2013.01); G06F 9/4443 (2013.01)

(58) Field of Classification Search
None
See application file for complete search history.

(56) References Cited

U.S. PATENT DOCUMENTS

2004/0167996 A1*  8/2004  Takamura et al. ........... 710/5
2012/0311578 A1* 12/2012  Hara et al. ................. 718/1

OTHER PUBLICATIONS

Sung, Dan; Samsung Galaxy S III: the phone is actually watching you; Pocket-lint.com, May 3, 2012.*

* cited by examiner

*Primary Examiner* — Meng An
*Assistant Examiner* — Bing Zhao
(74) *Attorney, Agent, or Firm* — Lowenstein Sandler LLP (57) ABSTRACT

A system and method for display power management in a virtualized environment are disclosed. In accordance with one embodiment, a hypervisor that is executed by a first computer system receives a notification that a host operating system of a second computer system has received a command to dim a video display of the second computer system, and forwards the notification to a guest operating system of a virtual machine hosted by the first computer system. The hypervisor receives from the guest operating system a first signal that indicates that the hypervisor is to notify the host operating system to refrain from executing the command. The hypervisor then transmits a second signal that notifies the host operating system to refrain from executing the command.

20 Claims, 9 Drawing Sheets

DISPLAY POWER MANAGEMENT IN DISTRIBUTED VIRTUALIZED SYSTEMS

TECHNICAL FIELD

This disclosure relates to computer systems, and more particularly, to display power management in virtualized computer systems.

BACKGROUND

A virtual machine (VM) is a portion of software that, when executed on appropriate hardware, creates an environment allowing the virtualization of an actual physical computer system (e.g., a server, a mainframe computer, etc.). The actual physical computer system is typically referred to as a "host machine" or a "physical machine," and the operating system of the host machine is typically referred to as the "host operating system."

A virtual machine may function as a self-contained platform, executing its own "guest" operating system and software applications. Typically, software on the host machine known as a "hypervisor" (or a "virtual machine monitor") manages the execution of one or more virtual machines, providing a variety of functions such as virtualizing and allocating resources, context switching among virtual machines, etc.

A virtual machine may comprise one or more "virtual processors," each of which maps, possibly in a many-to-one fashion, to a central processing unit (CPU) of the host machine. Similarly, a virtual machine may comprise one or more "virtual devices," each of which maps, typically in a one-to-one fashion, to a device of the host machine (e.g., a network interface device, a CD-ROM drive, etc.). The hypervisor manages these mappings in a transparent fashion, thereby enabling the guest operating system and applications executing on the virtual machine to interact with the virtual processors and virtual devices as though they were actual physical entities.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

An application that executes on a physical machine can provide power requirements to an operating system (OS). For example, a video player application might disable dimming of the video display when the application is visible on the display, but not when the application is minimized. However, this technique may not work when the application executes within a virtual machine. In other words, in the example above, if the video player application executes within a virtual machine (VM), then the disabling will not take effect, and consequently the display will be dimmable, even when the video player application is visible. Similarly, dimming may not be handled correctly when an application executing within a virtual machine outputs text or graphics to a video display of another computer system (e.g., an output host machine).

Described herein is a system and methods for handling display dimming when an application executes within a virtual machine. In accordance with one embodiment of the present disclosure, a hypervisor of a first computer system receives a notification that the host operating system (OS) of the second computer system has received a command to dim a video display of the second computer system, and forwards the notification to the guest OS of a virtual machine hosted by the first computer system. In response, the guest OS transmits a first signal that indicates that the hypervisor is to notify the host OS to refrain from executing the command. The hypervisor then transmits, in response to the first signal, a second signal that causes the host OS of the second computer system to refrain from executing the command. In this way, the guest OS, which typically lacks a facility to communicate directly with the host OS of the second computer system, can notify the host OS of the second computer system to refrain from executing the dimming command.

In one embodiment, dimming of the video display is always disabled via the above method, while in another embodiment, dimming of the video display is disabled only when the second computer system is communicably coupled to the first computer system (e.g., the first and second computer systems can communicate via a network, via a machine-to-machine direct link, etc.), while in yet another embodiment, dimming of the video display is disabled only when the second computer system is communicably coupled to the first computer system and output from the VM is visible in the video display. For example, when the second computer system is communicably coupled to the first computer system, but an application executing within the VM is in a minimized window, or is in a window completely behind another window, then in the latter embodiment, dimming of the video display is not disabled.

Embodiments of the present disclosure are thus capable of overcoming the inability of applications executing within a virtual machine to perform power management for remote video displays. In addition, embodiments of the present disclosure are also applicable to attenuating output of other types of remote output devices, such as lowering the volume of an audio speaker. For example, embodiments of the present disclosure may disable lowering of the volume of the audio portion of a streaming movie in a video player application. As in the case of display dimming, some embodiments may disable lowering the volume only when the host and remote computer systems are communicably coupled, while some other embodiments may disable lowering the volume only when the application is currently outputting audio to the remote speaker, while still other embodiments may always disable lowering the volume, regardless of whether the host and remote computer systems are communicably coupled or whether the application outputs audio to the speaker.

Figure 1:
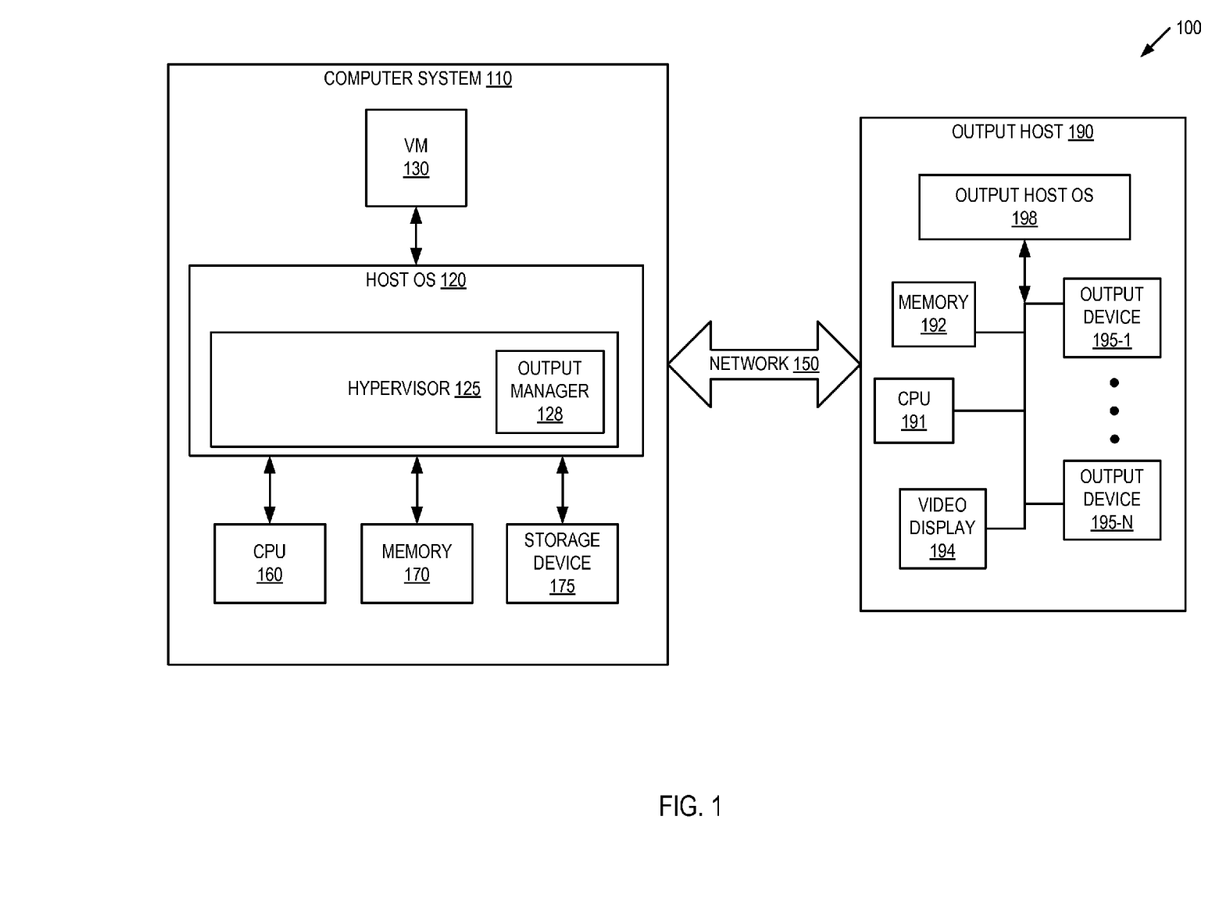
FIG. 1 depicts an illustrative computer system architecture, in accordance with an embodiment of the present invention.

FIG. 1 depicts an illustrative architecture of the salient elements of a system 100, in accordance with an embodiment of the present invention. One skilled in the art will appreciate that other architectures for system 100 are possible, and that the implementation of a computer system utilizing embodiments of the invention are not necessarily limited to the specific architecture depicted by FIG. 1.

As shown in FIG. 1, system 100 comprises a computer system 110 and an output host 190, connected via a network 150. Computer system 110 comprises a central processing unit (CPU) 160, main memory 170, which may include volatile memory devices (e.g., random access memory (RAM)), non-volatile memory devices (e.g., flash memory), and/or other types of memory devices, and storage device 175 (e.g., one or more hard disk drives, solid-state drives, etc.). It should be noted that although, for simplicity, a single CPU 160 is depicted in FIG. 1, in some other embodiments computer system 110 may comprise a plurality of CPUs 160, rather than a single CPU. Similarly, in some other embodiments computer system 110 may comprise a plurality of memories 170 and/or a plurality of storage devices 175.

The computer system 110 may be a server, a mainframe, a workstation, a personal computer (PC), a mobile phone, a palm-sized computing device, etc. The network 150 may be a private network (e.g., a local area network (LAN), a wide area network (WAN), intranet, etc.) or a public network (e.g., the Internet).

Computer system 110 runs a host operating system (OS) 120, which manages the hardware resources of the computer system and that provides functions such as interprocess communication, scheduling, memory management, and so forth. In one embodiment, host operating system 120 also comprises a hypervisor 125, which provides a virtual operating platform for virtual machine(s) 130 and that manages the execution of virtual machine(s) 130. It should be noted that in some alternative embodiments, hypervisor 125 may be external to host OS 120, rather than embedded within host OS 120.

In one embodiment, hypervisor 125 includes an output manager 128 that is capable of disabling dimming of remote video displays, disabling attenuation of remote output devices, determining whether another computer system (e.g., output host 190, etc.) is communicably coupled to computer system 110 (e.g., whether another computer system and computer system 110 can communicate via network 150, etc.), and determining whether output from virtual machine 130 is visible on a video display of another computer system (e.g., video display 194 of output host 190, etc.). Embodiments of operations of output manager 128 are described in more detail below with respect to FIGS. 3 through 7.

Virtual machine 130 is a software implementation of a machine that executes programs as though it were an actual physical machine. One embodiment of virtual machine 130 is described in more detail below with respect to FIG. 2.

Output host 190 comprises a central processing unit (CPU) 191, main memory 192, which may include volatile memory devices (e.g., random access memory (RAM)), non-volatile memory devices (e.g., flash memory), and/or other types of memory devices, a video display 194 (e.g., a liquid crystal display (LCD), a cathode ray tube (CRT) display, etc.), and one or more output devices 195-1 through 195-N (e.g., an audio speaker, a printer, etc.), where N is a positive integer. It should be noted that although, for simplicity, a single video display 194 is depicted in FIG. 1, in some other embodiments output host 190 may comprise a plurality of video displays.

Output host 190 may be a server, a mainframe, a workstation, a personal computer (PC), a mobile phone, a palm-sized computing device, etc. Output host 190 runs an output host OS 198 that manages the hardware resources of output host 190 and provides functions such as interprocess communication, scheduling, memory management, and so forth.

Figure 2:
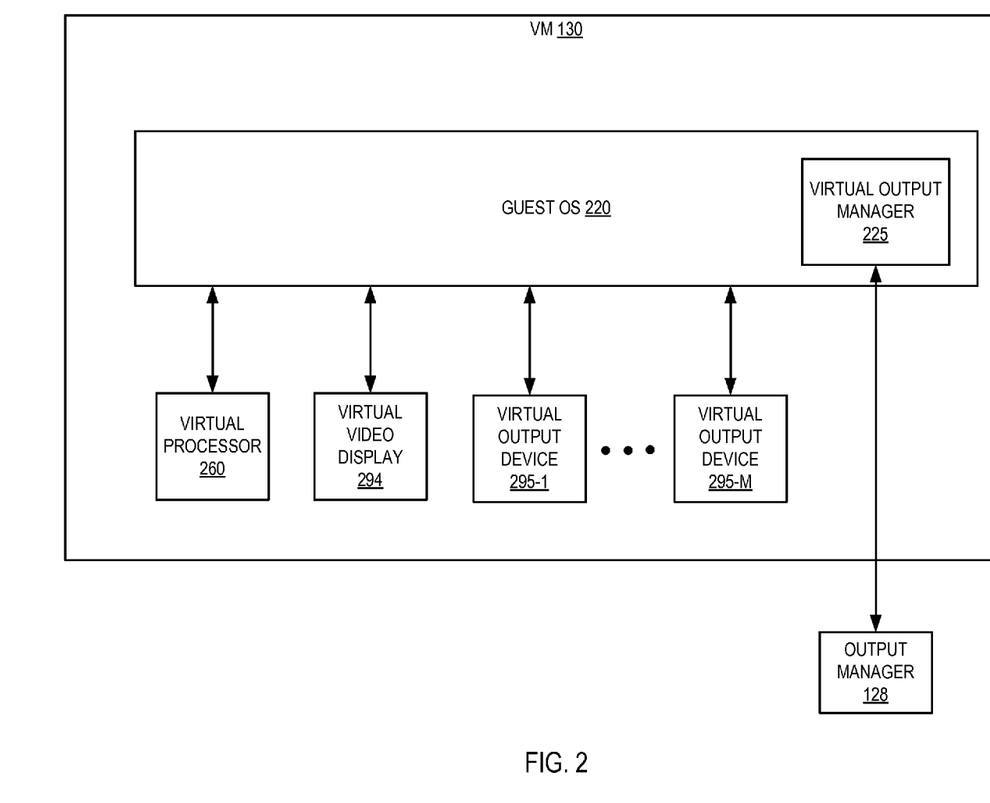
FIG. 2 depicts a block diagram of the salient elements of a virtual machine, in accordance with an embodiment of the present invention.

FIG. 2 depicts a block diagram of the salient elements of virtual machine 130, in accordance with an embodiment of the present invention. As shown in FIG. 2, virtual machine 130 comprises a guest operating system 220, a virtual processor 260, a virtual video display 294, and one or more virtual output devices 295-1 through 295-M, where M is a positive integer.

Guest operating system (OS) 220 comprises software that manages the execution of programs within virtual machine 130. In addition, guest OS 220 includes a virtual output manager 225 which is capable of performing the pertinent blocks of FIGS. 4 through 7 below, including transmitting signals that indicate that hypervisor 125 should notify output host OS 198 to refrain from executing display dimming commands.

Some embodiments of the functionality of virtual output manager 225 are described in detail below with respect to FIGS. 4 through 7.

Virtual processor 260 emulates a physical processor and maps to central processing unit (CPU) 160. Similarly, virtual video display 294 emulates and maps to a physical video display (e.g., video display 194 of output host 190, etc.), and each virtual output device 295 emulates and maps to a physical output device (e.g., an output device 195 of output host 190, etc.). In one embodiment, the mapping between virtual output devices 295 and output devices 195 may be one-to-one (in which case M=N), while in some other embodiments, the number of virtual devices 295 may not be the same as the number of devices 195 (i.e., M≠N), and/or the mapping may not be one-to-one. In one embodiment, hypervisor 125 manages these mappings in a transparent fashion, so that guest OS 220 and applications executing on virtual machine 130 interact with virtual processor 260, virtual video display 294 and virtual output devices 295 as though they were actual physical entities.

Figure 3:
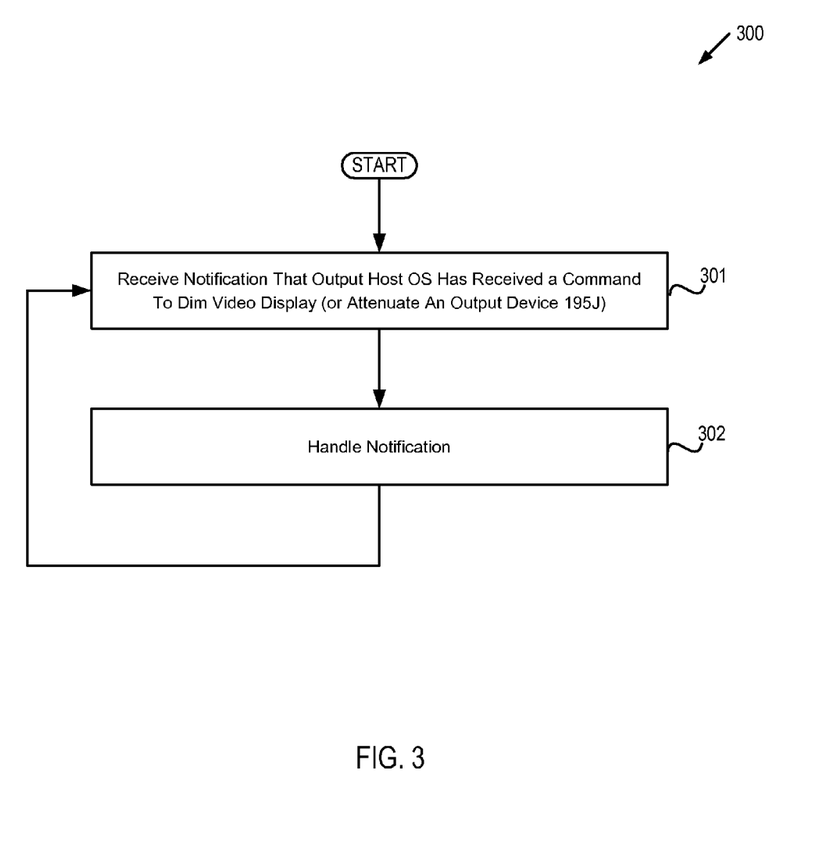
FIG. 3 depicts a flow diagram of one embodiment of a first method for display power management in a virtualized computer system.

FIG. 3 depicts a flow diagram of one embodiment of a first method 300 for display power management in a virtualized computer system. The method is performed by processing logic that may comprise hardware (circuitry, dedicated logic, etc.), software (such as is run on a general purpose computer system or a dedicated machine), or a combination of both. In one embodiment, the method is performed by the computer system 110 of FIG. 1 (e.g., by output manager 128 of hypervisor 125 and/or virtual output manager 225 of VM 130), while in some other embodiments, some or all of the method might be performed by another machine.

At block 301, a notification is received that indicates that output host OS 198 has received a command to dim a video display (e.g., video display 194 of output host 190, etc.), or to attenuate output of an output device (e.g., an output device 195-J of output host 190, where J is an integer between 1 and N inclusive). In one embodiment, the notification is from an application that executes in virtual machine 130 and wishes to disable dimming of the video display (e.g., in response to a user manipulating a slider control for the brightness of the video display, etc.) or disable attenuation of the output device.

In one embodiment, the notification is received by output manager 128 of hypervisor 125.

At block 302, the notification is handled. In one embodiment, the notification is handled by output manager 128 and virtual output manager 225 in accordance with the method of FIG. 4, described below, while in another embodiment the notification is handled by output manager 128 and virtual output manager 225 in accordance with the method of FIGS. 5A and 5B, described below. After block 302, execution continues back at block 301.

Figure 4:
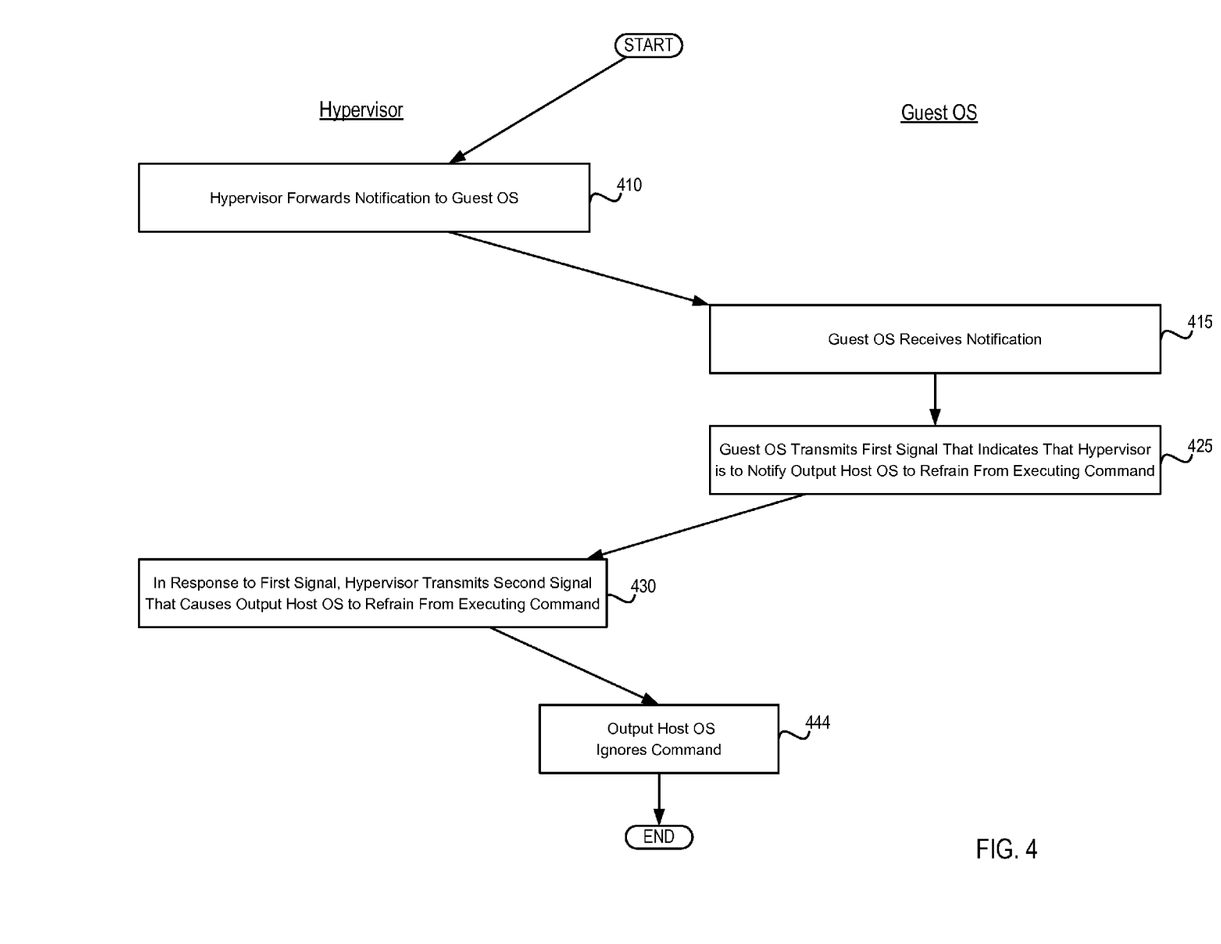
FIG. 4 depicts a flow diagram of one embodiment of a method by which a first computer system handles a notification that a host operating system of a second computer system has received a command to dim a video display of the second computer system.

FIG. 4 depicts a flow diagram of one embodiment of a method by which a first computer system (e.g., computer system 110, etc.) handles a notification that a host operating system of a second computer system (e.g., output host 190, etc.) has received a command to dim a video display (or attenuate an output device) of the second computer system. In this method, dimming of the display (or attenuation of the output device) is disabled regardless of whether the second computer system is communicably coupled to the first computer system (e.g., via a network, via a machine-to-machine direct link, etc.), and regardless of whether output from the virtual machine is visible in the video display of the second computer system. In some instances the handling of dimming and attenuation commands in the embodiment of FIG. 4 may be instead of that of FIGS. 5A and 5B, described below, where dimming of the display (or attenuation of the output device) is disabled only when the first and second computer systems are communicably coupled (or optionally, only when the first and second computer systems are communicably coupled and output from the virtual machine is also visible). It should be noted that blocks depicted in FIG. 4 can be performed simultaneously or in a different order than that depicted.

At block 410, hypervisor 125 forwards the notification to guest OS 220. In one embodiment, the notification is forwarded by output manager 128 and is received by virtual output manager 225.

At block 415, guest OS 220 receives the notification. At block 425, guest OS 220 transmits a first signal that indicates that hypervisor 125 should notify output host OS 198 to refrain from executing the command received at block 301 of FIG. 3, in order to prevent dimming of the video display (or attenuation of the output device) by the application within VM 130 that transmitted the notification at block 301. In one embodiment, virtual output manager 225 transmits this signal to output manager 128.

At block 430, hypervisor 125 transmits, in response to the first signal, a second signal that causes output host OS 198 to refrain from executing the command, in order to prevent dimming of the video display (or attenuation of the output device) via the application. In one embodiment, block 430 is performed by output manager 128. At block 444, output host OS 198 ignores the command, thereby ensuring that dimming of the video display (or attenuation of the output device) via the application is in fact disabled.

Figure 5A:
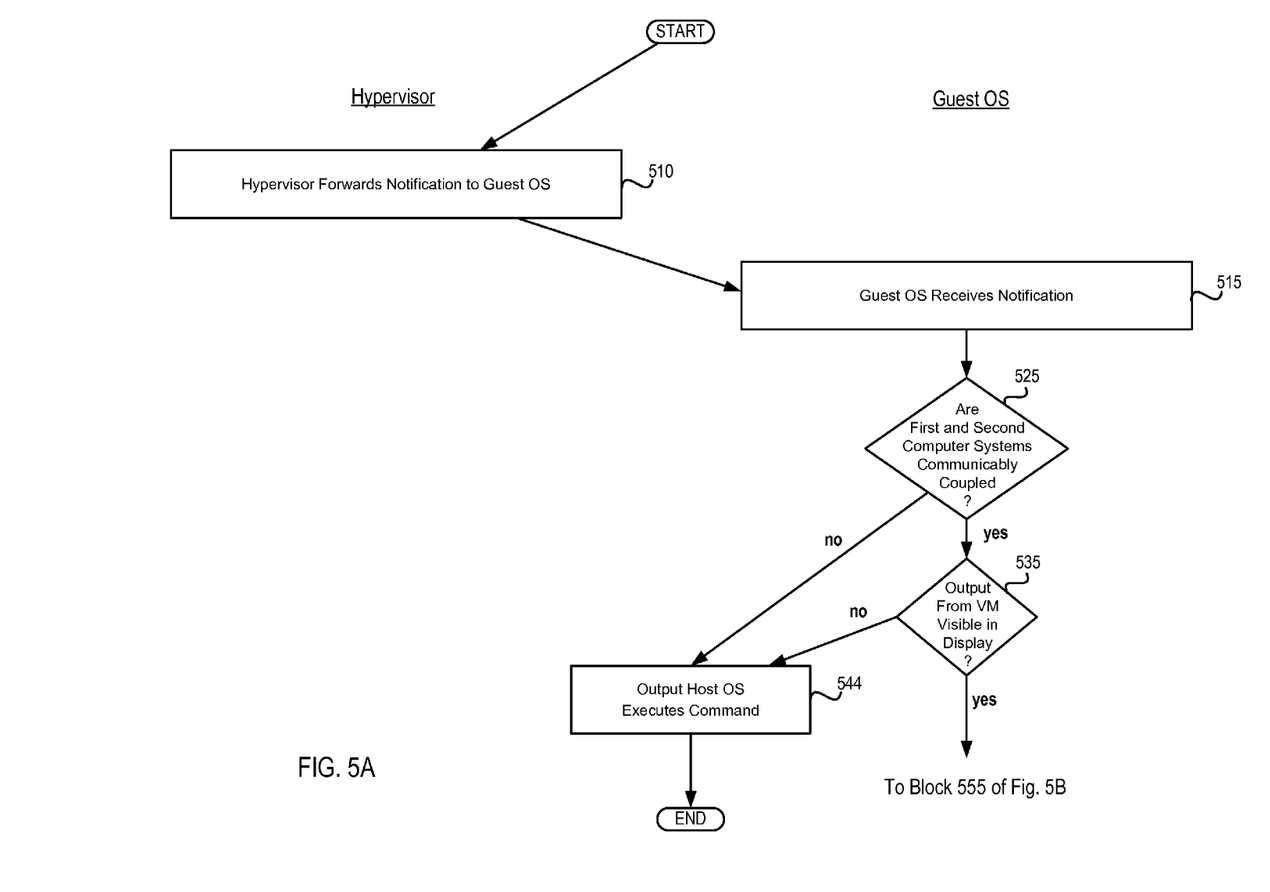
FIGS. 5A and 5B depict a flow diagram of one embodiment of another method by which a first computer system handles a notification that a host operating system of a second computer system has received a command to dim a video display of the second computer system.
Figure 5B:
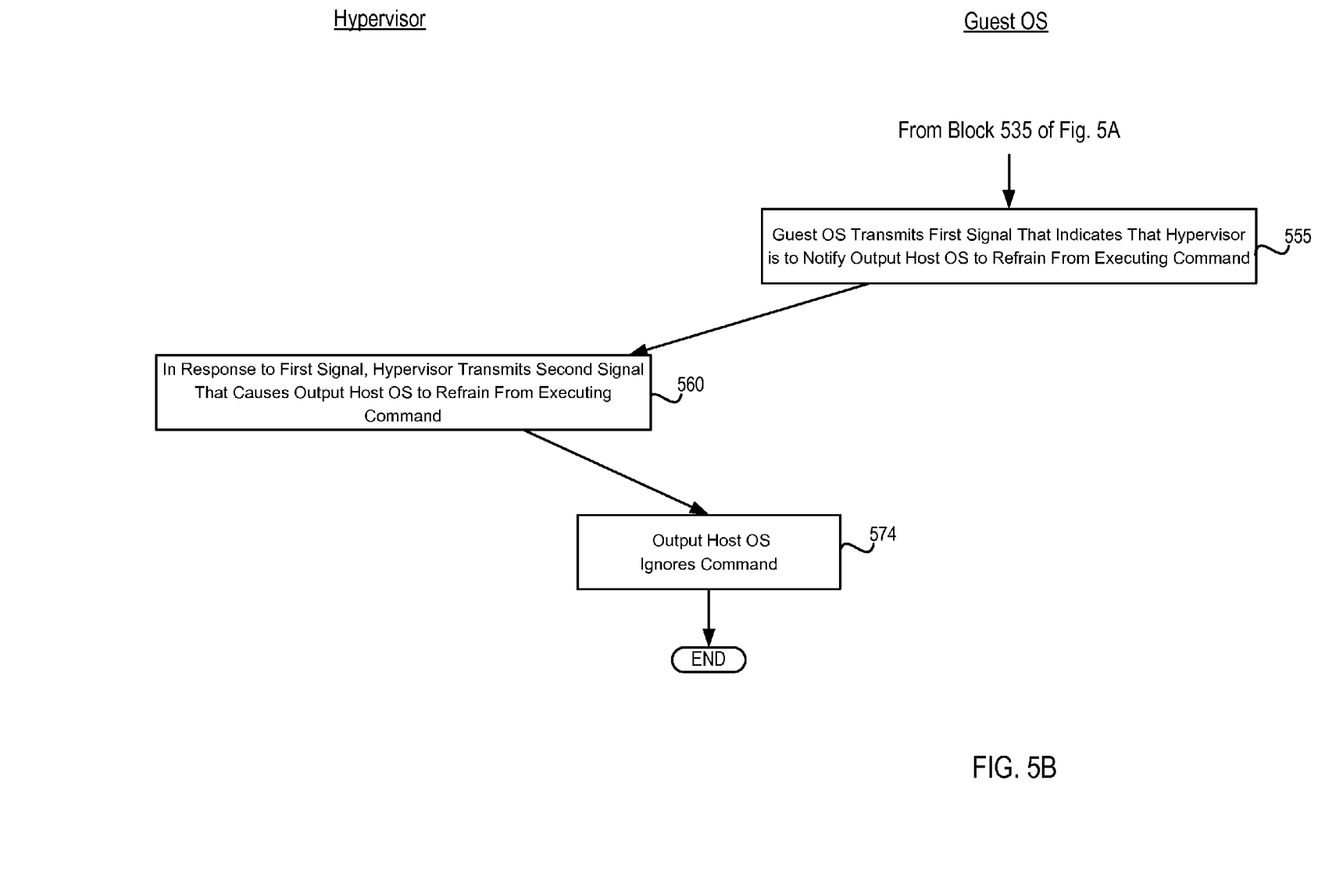

FIGS. 5A and 5B depict a flow diagram of one embodiment by which a first computer system (e.g., computer system 110, etc.) handles a notification that a host operating system of a second computer system (e.g., output host 190, etc.) has received a command to dim a video display (or attenuate an output device) of the second computer system. In this method, dimming of the display (or attenuation of the output device) is disabled only when the first computer system and the second computer system are communicably coupled (or optionally, only when the first and second computer systems are communicably coupled and output from the virtual machine is also visible). It should be noted that blocks depicted in FIGS. 5A and 5B can be performed simultaneously or in a different order than that depicted.

At block 510, hypervisor 125 forwards the notification to guest OS 220. In one embodiment, the notification is forwarded by output manager 128 and is received by virtual output manager 225.

At block 515, guest OS 220 receives the notification. Block 525 branches based on whether the first computer system and second computer system are communicably coupled. In one embodiment, hypervisor 125 may determine that the computer systems are communicably coupled and set a flag that enables guest OS 220 to check this condition at block 525, while in some other embodiments, this condition may be checked in some other manner.

If the first and second computer systems are not communicably coupled, then execution proceeds to block 544, otherwise execution continues at optional block 535 (or when optional block 535 is not implemented, at block 555 of FIG. 5B). In one embodiment, block 525 is performed by virtual output manager 225.

At optional block 535, execution branches based on whether output from the virtual machine is visible in the video display. If not, execution proceeds to block 544, otherwise execution continues at block 555 of FIG. 5B.

At block 544, output host OS 198 executes the command received at block 301 of FIG. 3, in normal fashion. After block 544, execution terminates.

At block 555 (FIG. 5B), guest OS 220 transmits a first signal that indicates that hypervisor 125 should notify output host OS 198 to refrain from executing the command received at block 301 of FIG. 3, in order to prevent dimming of the video display (or attenuation of the output device) by the application within VM 130 that transmitted the notification at block 301. In one embodiment, virtual output manager 225 transmits this signal to output manager 128.

At block 560, hypervisor 125 transmits, in response to the first signal, a second signal that causes output host OS 198 to refrain from executing the command, in order to prevent dimming of the display (or attenuation of the output device) by the application. In one embodiment, block 560 is performed by output manager 128. At block 574, output host OS 198 ignores the command, thereby ensuring that dimming of the display (or attenuation of the output device) by the application is in fact disabled.

It should be noted that some embodiments may incorporate additional features into the method of FIGS. 5A and 5B. For example, in some embodiments, when block 544 is executed, hypervisor 125 may also set a flag that indicates that the condition of block 525 (or, optionally, the condition of both block 525 and 535) was not satisfied, and may continue monitoring the condition to determine when it is subsequently satisfied. In such embodiments, when the condition is determined to be subsequently satisfied and the flag is set, hypervisor 125 may then clear the flag and transmit a signal that causes output host OS 198 to refrain from executing future dimming commands.

Figure 6:
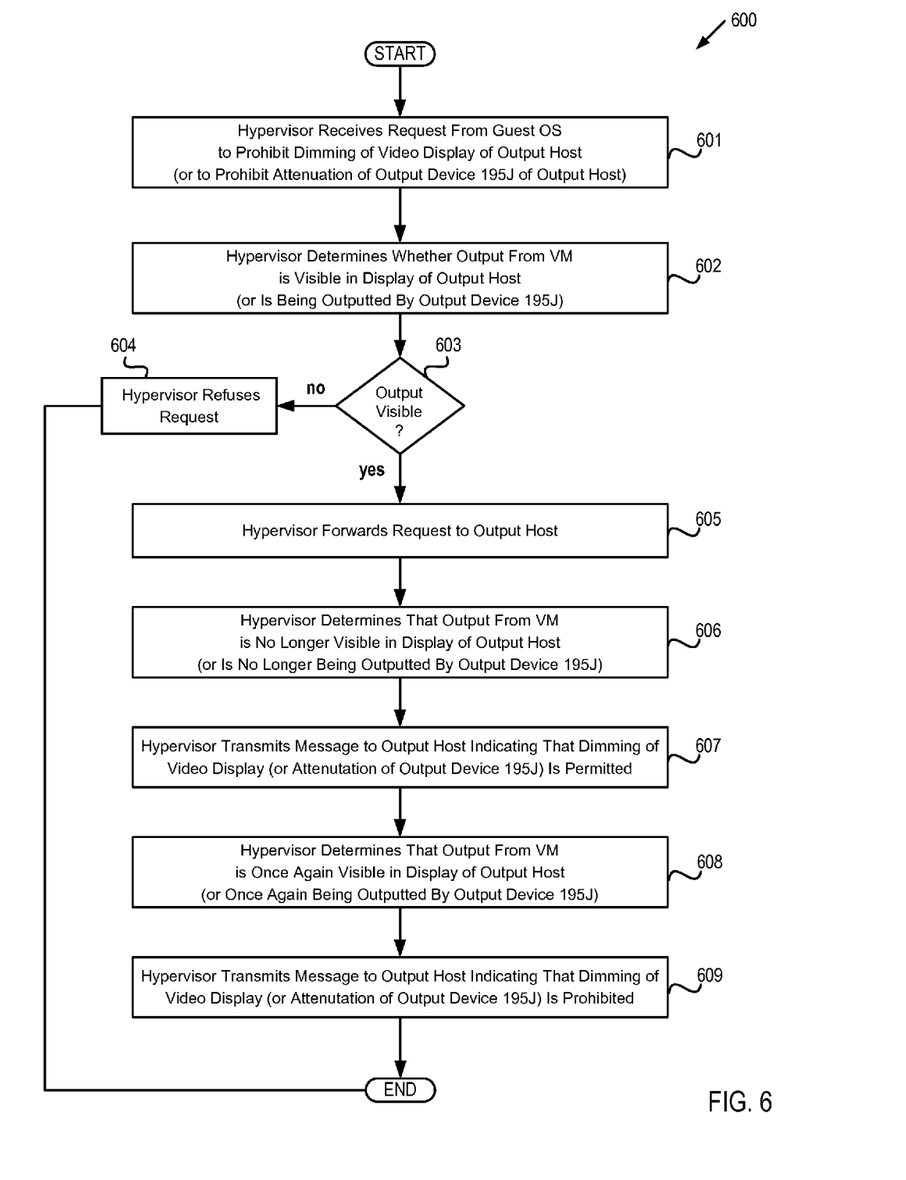
FIG. 6 depicts a flow diagram of one embodiment of a second method for display power management in a virtualized computer system.

FIG. 6 depicts a flow diagram of one embodiment of a second method 600 for display power management in a virtualized computer system. The method is performed by processing logic that may comprise hardware (circuitry, dedicated logic, etc.), software (such as is run on a general purpose computer system or a dedicated machine), or a combination of both. In one embodiment, the method is performed by the computer system 110 of FIG. 1 (e.g., by output manager 128 of hypervisor 125 and/or virtual output manager 225 of VM 130), while in some other embodiments, some or all of the method might be performed by another machine. It should be noted that blocks depicted in FIG. 6 can be performed simultaneously or in a different order than that depicted.

At block 601, hypervisor 125 receives a request from guest OS 220 to prohibit dimming of video display 194 of output host 190 (or to prohibit attenuation of an output device 195J of output host 190, where J is an integer between 1 and N inclusive). At block 602, hypervisor 125 determines whether output from virtual machine 130 is visible in display 194 of output host 190 (or is being outputted by output device 195J). Block 603 branches based on the determination of block 602; if output is not visible in display 194, then execution proceeds to block 604, otherwise execution continues at block 605.

At block 604, hypervisor 125 refuses the request. After block 604, execution of the method of FIG. 6 terminates.

At block 605, hypervisor 125 forwards the request to output host 190. At block 606, hypervisor 125 determines that output from virtual machine 130 is no longer visible in display 194 of output host 190 (or is no longer being outputted by output device 195J).

At block 607, hypervisor 125 transmits a message to output host 190 indicating that dimming of video display 194 (or attenuation of output device 195J) is permitted. At block 608, hypervisor 125 determines that output from virtual machine 130 is once again visible in display 194 of output host 190 (or is once again being outputted by output device 195J). At block 609, hypervisor 125 transmits a message to output host 190- indicating that dimming of video display 194 (or attenuation of output device 195J) is prohibited.

Figure 7:
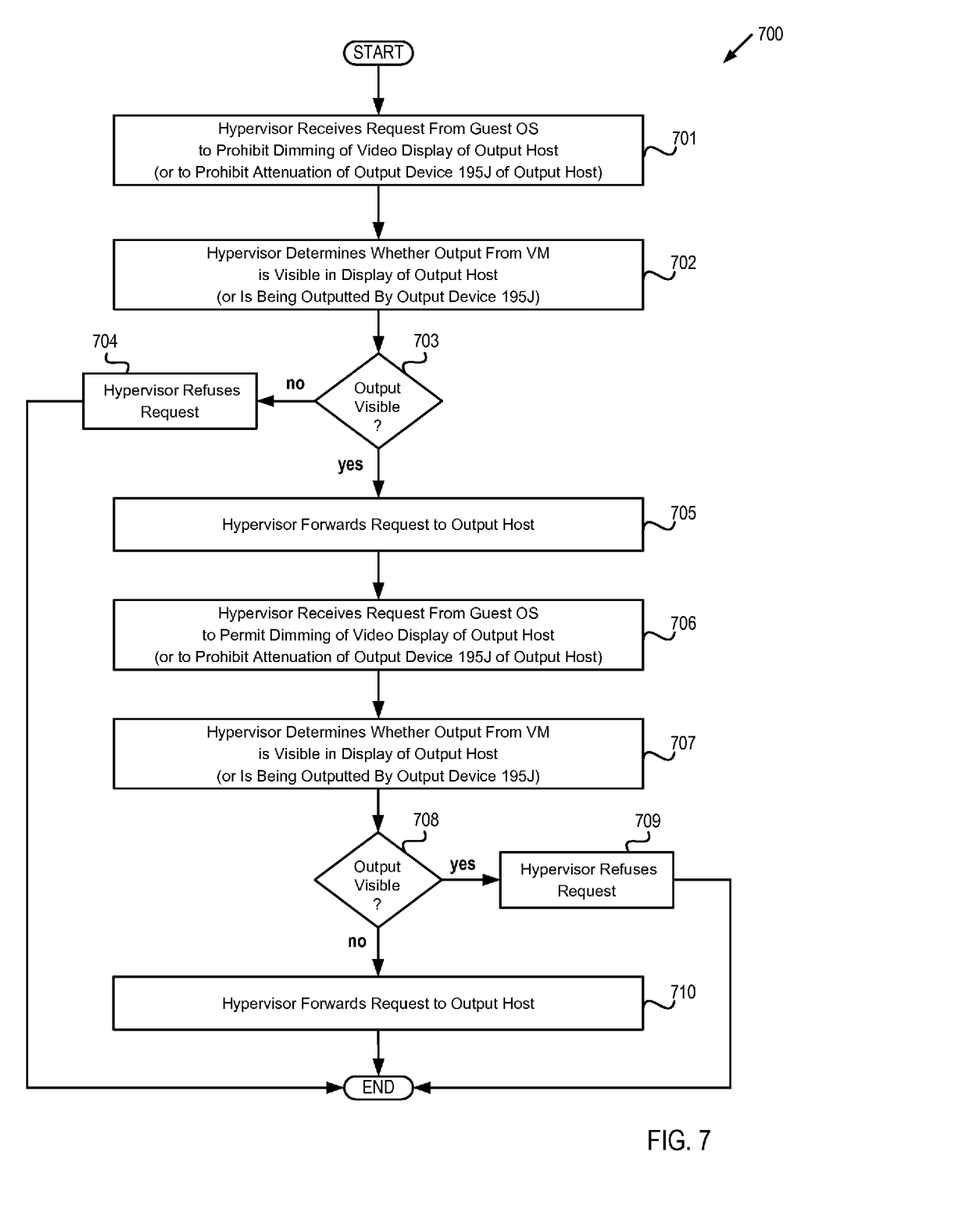
FIG. 7 depicts a flow diagram of one embodiment of a third method for display power management in a virtualized computer system.

FIG. 7 depicts a flow diagram of one embodiment of a third method for display power management in a virtualized computer system. The method is performed by processing logic that may comprise hardware (circuitry, dedicated logic, etc.), software (such as is run on a general purpose computer system or a dedicated machine), or a combination of both. In one embodiment, the method is performed by the computer system 110 of FIG. 1 (e.g., by output manager 128 of hypervisor 125 and/or virtual output manager 225 of VM 130), while in some other embodiments, some or all of the method might be performed by another machine. It should be noted that blocks depicted in FIG. 7 can be performed simultaneously or in a different order than that depicted.

At block 701, hypervisor 125 receives a request from guest OS 220 to prohibit dimming of video display 194 of output host 190 (or to prohibit attenuation of an output device 195J of output host 190, where J is an integer between 1 and N inclusive). At block 702, hypervisor 125 determines whether output from virtual machine 130 is visible in display 194 of output host 190 (or is being outputted by output device 195J). Block 703 branches based on the determination of block 702; if output is not visible in display 194, then execution proceeds to block 704, otherwise execution continues at block 705.

At block 704, hypervisor 125 refuses the request. After block 704, execution of the method of FIG. 7 terminates.

At block 705, hypervisor 125 forwards the request to output host 190. At block 706, hypervisor 125 receives a request from guest OS 220 to permit dimming of video display 194 (or to prohibit attenuation of output device 195J). At block 707, hypervisor 125 determines whether output from virtual machine 130 is visible in display 194 (or is being outputted by output device 195J). Block 708 branches based on the determination of block 707; if output is visible in display 194, then execution proceeds to block 709, otherwise execution continues at block 710.

At block 709, hypervisor 125 refuses the request. After block 709, execution of the method of FIG. 7 terminates. At block 710, hypervisor 125 forwards the request to output host 190.

Figure 8:
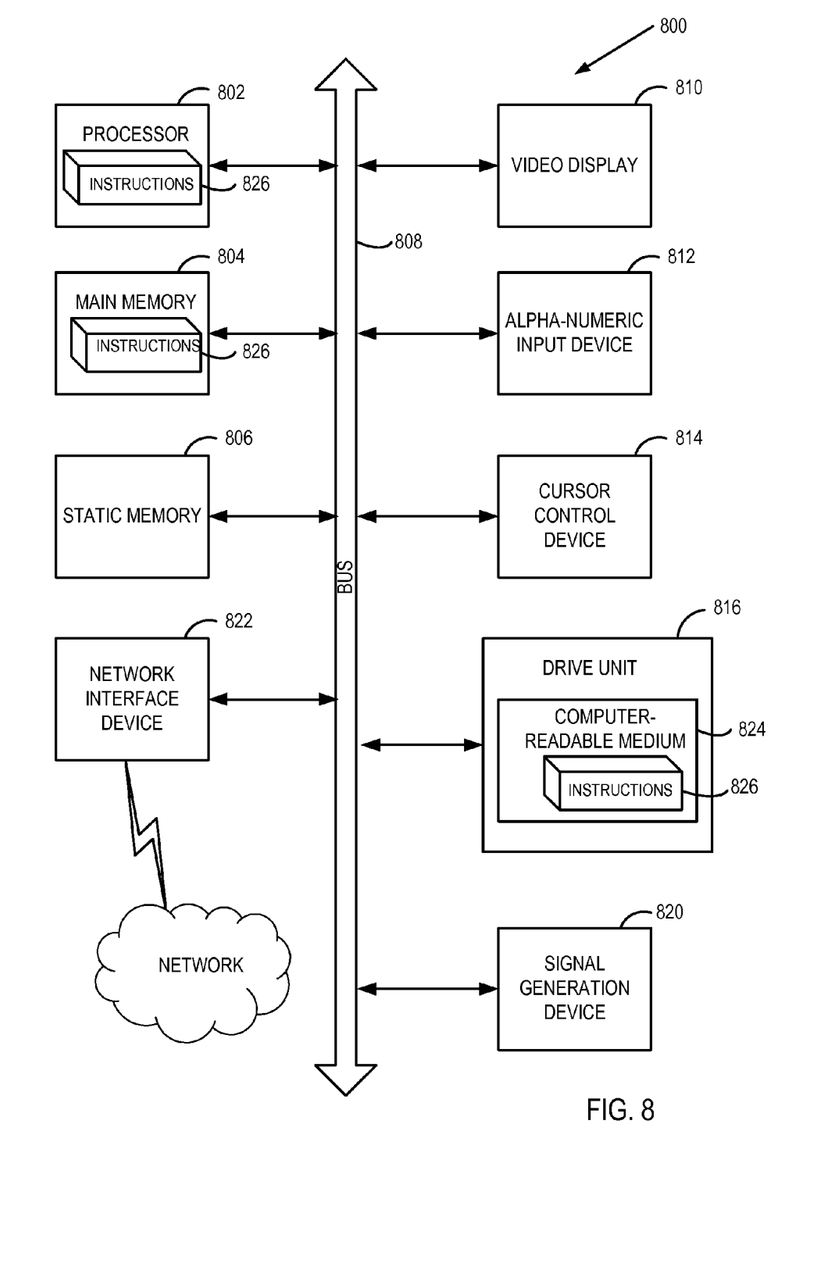
FIG. 8 depicts a block diagram of an illustrative computer system operating in accordance with embodiments of the invention.

FIG. 8 depicts an illustrative computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The illustrative computer system 800 includes a processing system (processor) 802, a main memory 804 (e.g., read-only memory (ROM), flash memory, dynamic random access memory (DRAM) such as synchronous DRAM (SDRAM)), a static memory 806 (e.g., flash memory, static random access memory (SRAM)), and a data storage device 816, which communicate with each other via a bus 808.

Processor 802 represents one or more general-purpose processing devices such as a microprocessor, central processing unit, or the like. More particularly, the processor 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 802 may also be one or more special-purpose processing devices such as an application specific integrated circuit (ASIC), a field programmable gate array (FPGA), a digital signal processor (DSP), network processor, or the like. The processor 802 is configured to execute instructions 826 for performing the operations and steps discussed herein.

The computer system 800 may further include a network interface device 822. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 820 (e.g., a speaker).

The data storage device 816 may include a computer-readable medium 824 on which is stored one or more sets of instructions 826 (e.g., instructions corresponding to the method of FIG. 3, etc.) embodying any one or more of the methodologies or functions described herein. Instructions 826 may also reside, completely or at least partially, within the main memory 804 and/or within the processor 802 during execution thereof by the computer system 800, the main memory 804 and the processor 802 also constituting computer-readable media. Instructions 826 may further be transmitted or received over a network via the network interface device 822.

While the computer-readable storage medium 824 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "forwarding", "transmitting", "determining", "refraining", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an computer system for performing the operations herein. This computer system may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other computer system. Various general purpose systems may be used with programs in accordance with the teachings herein, or it may prove convenient to construct more specialized computer system to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
receiving from a guest operating system of a virtual machine, by a hypervisor that is executed by a processing device of a first computer system, a first signal that indicates that the hypervisor is to notify a host operating system of a second computer system to refrain from executing a command to dim a video display of the second computer system, wherein the first signal is transmitted by the guest operating system when the second computer system is communicably coupled to the first computer system and output of the virtual machine is visible on the video display;
transmitting by the hypervisor, in response to the first signal, a second signal that notifies the host operating system to refrain from executing the command; and
setting a flag in response to at least one of the second computer system becoming communicably uncoupled from the first computer system or output from the virtual machine no longer being visible in the video display.

2. The method of claim 1 wherein the hypervisor determines that output from the virtual machine is no longer visible in the video display.

3. The method of claim 1 wherein the hypervisor determines that the second computer system becomes communicably uncoupled from the first computer system.

4. The method of claim 1 further comprising:
determining, while the flag is set, that the second computer system is communicably coupled to the first computer system and that output from the virtual machine is visible in the video display; and in response to the determining, clearing the flag and transmitting a signal that notifies the host operating system to refrain from executing future dimming commands.

5. The method of claim 1 further comprising:
receiving, by the hypervisor, a notification that the host operating system has received the command; and
forwarding, by the hypervisor, the notification to the guest operating system.

6. The method of claim 5 wherein the guest operating system is modified to receive the notification from the hypervisor.

7. The method of claim 5 wherein the guest operating system is configured to transmit the first signal in response to the notification from the hypervisor.

8. The method of claim 1 wherein the command to dim the video display is submitted by a machine that is different than the first computer system.

9. A first computer system comprising:
a network interface device; and
a processing device, operatively coupled to the network interface device, to:
execute a hypervisor,
receive from a guest operating system of a virtual machine, via the hypervisor, a first signal that indicates that the hypervisor is to notify a host operating system of a second computer system to refrain from executing a command to dim a video display of the second computer system, wherein the first signal is transmitted by the guest operating system when the second computer system is communicably coupled to the first computer system and output of the virtual machine is visible on the video display,
transmit via the network interface device, in response to the first signal, a second signal that notifies the host operating system to refrain from executing the command, and
set a flag in response to at least one of the second computer system becoming communicably uncoupled from the first computer system or output from the virtual machine no longer being visible in the video display.

10. The first computer system of claim 9 wherein the processing device is further to determine via the hypervisor that output from the virtual machine is no longer visible in the video display.

11. The first computer system of claim 9 wherein the processing device is further to determine via the hypervisor that the second computer system becomes communicably uncoupled from the first computer system.

12. The first computer system of claim 9 wherein the processing device is further to:
determine, while the flag is set, that the second computer system is communicably coupled to the first computer system and that output from the virtual machine is visible in the video display; and
in response to the determining, clearing the flag and transmitting-a signal that notifies the host operating system to refrain from executing future dimming commands.

13. The first computer system of claim 9 wherein the processing device is further to:
receive, via the hypervisor, a notification that the host operating system has received the command; and
forward, via the hypervisor, the notification to the guest operating system.

14. The first computer system of claim 13 wherein the guest operating system is modified to receive the notification from the hypervisor.

15. The first computer system of claim 13 wherein the guest operating system is configured to transmit the first signal in response to the notification from the hypervisor.

16. The first computer system of claim 9 wherein the command to dim the video display is submitted by a machine that is different than the first computer system.

17. A non-transitory computer readable storage medium, having instructions stored therein, which when executed, cause a processing device of a first computer system to:
execute a hypervisor;
receive from a guest operating system of a virtual machine, via the hypervisor, a first signal that indicates that the hypervisor is to notify a host operating system of a second computer system to refrain from executing a command to dim a video display of the second computer system, wherein the first signal is transmitted by the guest operating system when the second computer system is communicably coupled to the first computer system and output of the virtual machine is visible on the video display;
transmit via the hypervisor, in response to the first signal, a second signal that notifies the host operating system to refrain from executing the command; and
set a flag in response to at least one of the second computer system becoming communicably uncoupled from the first computer system or output from the virtual machine no longer being visible in the video display.

18. The non-transitory computer readable storage medium of claim 17, wherein the instructions further cause the processing device to determine via the hypervisor that output from the virtual machine is no longer visible in the video display.

19. The non-transitory computer readable storage medium of claim 17, wherein the instructions further cause the processing device to determine via the hypervisor that the second computer system becomes communicably uncoupled from the first computer system.

20. The non-transitory computer readable storage medium of claim 17, wherein the instructions further cause the processing device to:
determine, while the flag is set, that the second computer system is communicably coupled to the first computer system and that output from the virtual machine is visible in the video display; and
in response to the determining, clearing the flag and transmitting-a signal that notifies the host operating system to refrain from executing future dimming commands.

* * * * *